(12) United States Patent
Tan et al.

(10) Patent No.: US 10,499,665 B2
(45) Date of Patent: Dec. 10, 2019

(54) COMPLETE DIET SUITABLE FOR CATTLE IN DIFFERENT FATTENING STAGES AND METHOD FOR FORMULATING THE SAME

(71) Applicants: GUANGDONG PROVINCIAL BIOENGINEERING INSTITUTE (GUANGZHOU SUGARCANE INDUSTRY RESEARCH INSTITUTE), Guangdong (CN); GUANGXI STATE FARMS JINGUANG DAIRY INDUSTRY CO., LTD., Guangxi (CN)

(72) Inventors: Wenxing Tan, Guangdong (CN); Ximiao Yi, Guangdong (CN); Jiazhou Wei, Guangxi (CN); Dafeng Liang, Guangdong (CN); Hongqiao Wei, Guangxi (CN); Bu Ma, Guangxi (CN); Zengwei Huang, Guangdong (CN); Zhijian Wei, Guangxi (CN); Zhaopeng Wu, Guangdong (CN); Guowei Chang, Guangdong (CN); Yu Zhang, Guangxi (CN)

(73) Assignees: GUANGDONG PROVINCIAL BIOENGINEERING INSTITUTE (GUANGZHOU SUGARCANE INDUSTRY RESEARCH INSTITUTE), Guangdong (CN); GUANGXI STATE FARMS JINGUANG DAIRY INDUSTRY CO., LTD., Guangxi (CN)

( * ) Notice: Subject to any disclaimer, the term of this patent is extended or adjusted under 35 U.S.C. 154(b) by 169 days.

(21) Appl. No.: 15/808,040

(22) Filed: Nov. 9, 2017

(65) Prior Publication Data
US 2018/0064139 A1 Mar. 8, 2018

Related U.S. Application Data

(63) Continuation of application No. PCT/CN2017/073381, filed on Feb. 13, 2017.

(30) Foreign Application Priority Data

Mar. 2, 2016 (CN) .......................... 2016 1 0119553

(51) Int. Cl.
*A23K 50/10* (2016.01)
*A23K 10/30* (2016.01)
*A23K 10/37* (2016.01)

(52) U.S. Cl.
CPC .............. *A23K 50/10* (2016.05); *A23K 10/30* (2016.05); *A23K 10/37* (2016.05)

(58) Field of Classification Search
CPC ........ A23K 50/10; A23K 20/20; A23K 10/30; A23K 10/37; Y02P 60/877
See application file for complete search history.

(56) References Cited

U.S. PATENT DOCUMENTS

| 3,856,940 A | * | 12/1974 | Hamill | .................... | A61K 36/06 424/121 |
| 3,873,728 A | * | 3/1975 | Moore | .................... | C05C 9/005 426/2 |
| 2011/0123671 A1 | * | 5/2011 | Miura | .................... | A23K 50/60 426/2 |

FOREIGN PATENT DOCUMENTS

| CN | 102499332 A | * | 6/2012 |
| CN | 105076753 A | | 11/2015 |
| CN | 105746915 A | | 7/2016 |
| CN | 106173375 A | | 12/2016 |

OTHER PUBLICATIONS

Machine translation and abstract of CN103892127B dated Jul. 2014 (Year: 2014).*
Ferreiro et al. "Fattening Cattle with Sugar Cane: The effect of different proportions of stalk and tops", Tropical Animal Production, vol. 3, No. 1 pp. 31-38, 1976 (Year: 1976).*
Wu, Zhaopeng et al. "Concoction of Fine Feed From Sugarcane by-Product and Beef Cattle Feeding Evaluation", Sugarcane and Canesugar, Dec. 31, 2015, No. 6, 2015, pp. 29-32.
International Search Report with Written Opinion, dated Apr. 20, 2017, for corresponding international application PCT/CN2017/073381.

* cited by examiner

*Primary Examiner* — C. Sayala
(74) *Attorney, Agent, or Firm* — Myers Wolin, LLC

(57) ABSTRACT

A complete ration, or diet, suitable for beef cattle in different fattening stages is provided, as well as a method for formulating the ration. All by-products of sugar manufacture are recycled and used to formulate the complete ration for beef cattle in different fattening stages, using sugarcane tip leaves and alkalized bagasse as raw materials, using molasses and corn flour as energy feed, using peanut bran, soybean residual, rapeseed meal, etc., as protein feed, using carbamide, dicalcium phosphate, limestone powder, bacteria strain and pre-mixture as other additives. The complete ration suitable for beef cattle in each growing stages can be flexibly formulated according to nutrients requirements of beef cattle in different growing stages. Comparing to the regular feed for the same fattening stage, the complete ration described can lead to a lower production cost and a lower ratio between feed and weight, and bring higher economic values.

5 Claims, No Drawings

COMPLETE DIET SUITABLE FOR CATTLE IN DIFFERENT FATTENING STAGES AND METHOD FOR FORMULATING THE SAME

CROSS REFERENCE TO RELATED APPLICATIONS

This application is a continuation under 35 U.S.C. § 120 of International Application PCT/CN2017/073381, filed Feb. 13, 2017, which claims priority to Chinese Application 201610119553.8, filed Mar. 2, 2016, the contents of each of which are incorporated by reference herein.

FIELD OF THE INVENTION

The present invention relates to the field of feed, and more particularly to a complete ration, or diet, suitable for beef cattle in different fattening stages and method for formulating the same.

BACKGROUND

There are three stages in beef cattle fattening, store cattle, compensatory growth and meat quality improvement. During the growing period of the beef cattle, the growing intensity of the bone, the muscle and the fat is not synchronized, but has a growing sequence. Generally, in the store cattle stage, organs grow fast, and supplying of nutrition is high protein and low energy. Therefore, the complete ration that suits for different fattening stages plays an important role on the feeding of beef cattle, which not only saves the consumption of concentrated feed and reduces growing cost, but also produces high quality and better beef cattle and allow the beef cattle to play their growing potential to achieve the best fattening result.

There are more than 500 sugar factories in China, by-products of sugar manufacture are bagasse, molasses and sugarcane tip leaves. About 10 million tons of by-products are accumulated per year, which become trash and are hard to dispose. Currently, the disadvantages concerning the by-products of sugar manufacture are single utilization mode and low recycling profit. In particular, bagasse is burned as fuel of boiler in the sugar factories, molasses is used to produce alcohol, and sugarcane tip leaves are directly used for feeding and ensiling.

There are plenty of nutriments in the by-products of sugar manufacture, such as, crude protein and a lot of crude fiber in the bagasse; a high content of sugar in the molasses; and sugar, protein and kinds of vitamins in tip leaves of sugarcane. Theoretically, these nutriments can be reutilized after disposing. However, the bagasse is rarely used as feed due to a high content of lignin which has a poor palatability. In addition, due to a high content of ash in the by-products, suitable methods are required to improve the efficiency of feed utilization.

SUMMARY

The purpose of the present invention is to provide a complete ration suitable for beef cattle in different fattening stages and a method for formulating the same using fully recycled by-products of sugar manufacture.

The technical solution of the present invention is:

A complete ration suitable for beef cattle in different fattening stages, including the following materials: bagasse 15~45 parts, sugarcane tip leaves 25~70 parts, molasses 4~18 parts, corn flour 1~12 parts, legume by-product 4~12 parts, rapeseed meal 4~12 parts, residual 4~12 parts, carbamide 0.1~1.2 parts, dicalcium phosphate 0.4~1.8 parts, limestone powder 0.4~1.2 parts, bacteria strain 0.05~0.6 part and pre-mixture 0.4~1.2 parts, and all parts are parts by weight.

Formula of the complete ration for beef cattle at age of 7-13 months includes the following materials: bagasse 15~25 parts, sugarcane tip leaves 55~70 parts, molasses 4~6 parts, corn flour 1~3 parts, legume by-product 9~12 parts, rapeseed meal 9~12 parts, residual 4~6 parts, carbamide 0.1~0.3 parts, dicalcium phosphate 1.2~1.8 parts, limestone powder 0.9~1.2 parts, bacteria strain 0.05~0.2 part and pre-mixture 0.4~0.6 part, and all parts are parts by weight.

Preferably, formula of the complete ration for beef cattle at age of 7-13 months includes the following materials: bagasse 20 parts, sugarcane tip leaves 60 parts, molasses 5 parts, corn flour 2 parts, legume by-product 10 parts, rapeseed meal 10 parts, residual 5 parts, carbamide 0.2 parts, dicalcium phosphate 1.5 parts, limestone powder 1 part, bacteria strain 0.1 part, and pre-mixture 0.5 part, and all parts are parts by weight.

Formula of the complete ration for beef cattle at age of 14-18 months includes the following materials: bagasse 25~35 parts, sugarcane tip leaves 40~55 parts, molasses 12~18 parts, corn flour 8~12 parts, legume by-product 6~9 parts, rapeseed meal 6~9 parts, residual 6~9 parts, carbamide 0.3~0.8 part, dicalcium phosphate 0.8~1.2 parts, limestone powder 0.6~0.9 part, bacteria strain 0.2~0.4 part and pre-mixture 0.6~0.9 part, and all parts are parts by weight.

Preferably, formula of the complete ration for beef cattle at age of 14-18 months includes the following materials: bagasse 30 parts, sugarcane tip leaves 45 parts, molasses 15 parts, corn flour 10 parts, legume by-product 7.5 parts, rapeseed meal 7.5 parts, residual 7.5 parts, carbamide 0.6 part, dicalcium phosphate 1 part, limestone powder 0.75 part, bacteria strain 0.3 part and pre-mixture 0.75 part, and all parts are parts by weight.

Formula of the complete ration for beef cattle at age of 19-24 months includes the following materials: bagasse 35~45 parts, sugarcane tip leaves 25~40 parts, molasses 6~12 parts, corn flour 3~8 parts, legume by-product 4~6 parts, rapeseed meal 4~6 parts, residual 9~12 parts, carbamide 0.8~1.2 parts, dicalcium phosphate 0.4~8. parts, limestone powder 0.4~6. parts, bacteria strain 0.4~6. parts and pre-mixture 0.9~1.2 parts, and all parts are parts by weight.

Preferably, formula of the complete ration for beef cattle at age of 19-24 months includes the following materials: bagasse 40 parts, sugarcane tip leaves 30 parts, molasses 10 parts, corn flour 6 parts, legume by-product 5 parts, rapeseed meal 5 parts, residual 10 parts, carbamide 1 part, dicalcium phosphate 0.5 part, limestone powder 0.5 part, bacteria strain 0.5 part and pre-mixture 1 part, and all parts are parts by weight.

Said legume by-product is peanut bran or soybean residual.

Said residual is beer residual or cassava residual.

A method for formulating a complete ration suitable for beef cattle in different fattening stages, comprising the following steps according to the above-mentioned formula of the complete ration:

(1) Adjusting water content of bagasse to 55~85%, immersing the bagasse in an alkaline solution for 15~65 mins, and then discharging the alkaline solution to obtain alkalized bagasse for use;

(2) filament-rubbing or cutting sugarcane tip leaves into segments, then adding the alkalized bagasse obtained in step (1) and mixing and stirring well to obtain a coarse feed;

(3) adding molasses, corn flour, peanut bran, soybean residual, rapeseed meal, beer residual or cassava residual, carbamide, dicalcium phosphate, limestone powder, bacteria strain and pre-mixture to the coarse feed obtained in step (2) and mixing well; and (4) storing in a sealed bag for more than 10 days.

Preferably, in step (1), the water content of the bagasse is adjusted to 60%~80%.

Preferably, in step (1), the alkaline solution is sodium hydroxide solution, with a concentration of 3%~8% by mass percent.

Preferably, in step (1), the alkaline solution immersion is performed for 20-60 mins.

Preferably, in step (1), the water content of the alkalized bagasse is 55%~65%.

Advantageous effects of the present invention are as follows:

(1) In the present invention, all by-products of sugar manufacture are recycled and used to formulate the complete ration for beef cattle in different fattening stages, realizing the resource utilization of the by-products in sugar manufacture. Comparing to normal feed at the same stage, the complete ration formulated according to different fattening stages of beef cattle has lower production cost and lower feed-weight ratio, which brings higher economic value.

(2) The present invention is able to make adjustment to material percentage flexibly to produce complete ration satisfied for beef cattle in different fattening stage: the formula of complete ration for beef cattle at age of 7-13 months focuses on increasing the content of crude protein (more than 16%), and increasing the additive amount of peanut bran and rapeseed meal; the formula of complete ration for beef cattle at age of 14-18 months focuses on increasing feed related with energy (more than 14% of crude protein), and increasing the additive amount of corn flour and molasses; the formula of complete ration for beef cattle at age of 19-24 months focuses on increasing feed related with crude fiber (11%-13% of crude protein), and increasing the additive amount of alkalized bagasse and residual.

(3) The bagasse used in the present invention is subjected to alkaline solution treatment, which destroys cell wall structure of the bagasse, thus not only leading to decomposed lignin, softened sugarcane bagasse and improved taste, but also improving the adsorption property of the bagasse to facilitate nutriment absorption in the complete ration. Thus, these nutriments can be decomposed after entering into stomach without taking longer, improving the absorption of nutriments dramatically.

(4) The bagasse subjected to alkaline solution treatment is mixed with the sugarcane tip leaves to alkalize the sugarcane tip leaves with the alkaline solution left in bagasse so as to soften the coarse feed. In addition, the reasonable collocation of long and short fibers increases the rumination times of beef cattle, facilitating the digestion and absorption of the complete ration.

DETAILED DESCRIPTION OF THE PREFERRED EMBODIMENTS

The invention is further illustrated below with reference to embodiments, and all substitutions or modifications made without departing from the spirit of the invention fall within the protection scope of the invention.

Embodiment 1. Formula of Complete Ration for the First Fattening Stage (at an Age of 7-13 Months)

(1) Adding water to 20 kg bagasse to adjust the water content to 70%, immersing it in a sodium hydroxide with a concentration of 6% (w/w) for 50 mins, and then squeezing it to obtain alkalized bagasse with a water content of 55% for use;

(2) filament-rubbing or cutting 60 kg sugarcane tip leaves into small segments of about 3-4 cm, adding the alkalized bagasse obtained in step (1), and mixing and stirring well to obtain a coarse feed;

(3) adding 5 kg molasses, 2 kg corn flour, 10 kg peanut bran, 10 kg rapeseed meal, 5 kg beer residual, 0.2 kg carbamide, 1.5 kg dicalcium phosphate, 1 kg limestone powder, 0.5 kg pre-mixture and 0.1 kg bacteria strain into the coarse feed obtained in step (2), and mixing well; and (4) compressing the mixed material obtained in step (3) into cubes of a certain length by a hydraulic baling device, and then storing in a sealed bag for more than 10 days.

Embodiment 2. Formula of Complete Ration for the Second Fattening Stage (at an Age of 14-18 Months)

(1) Adding water to 30 kg bagasse to adjust the water content to 80%, immersing it in the sodium hydroxide with a concentration of 8% (w/w) for 20 mins, and then squeezing it to obtain alkalized bagasse with a water content of 65% for use;

(2) filament-rubbing or cutting 45 kg sugarcane tip leaves into small segments of about 3-4 cm, adding the alkalized sugarcane bagasse obtained in step (1), and mixing and stirring well to obtain a coarse feed;

(3) adding 15 kg molasses, 10 kg corn flour, 7.5 kg peanut bran, 7.5 kg rapeseed meal, 7.5 kg beer residual, 0.6 kg carbamide, 1 kg dicalcium phosphate, 0.75 kg limestone powder, 0.75 kg pre-mixture and 0.3 kg bacteria strain into the coarse feed obtained in step (2), and mixing well; and (4) compressing the mixed material obtained in step (3) into cubes of a certain length cubic by a hydraulic baling device, and then storing in a sealed bag for more than 10 days.

Embodiment 3. Formula of Complete Ration for the Third Fattening Stage (at an Age of 19-24 Months)

(1) Adding water to 40 kg bagasse into water to adjust the water content to 60%, immersing it in the sodium hydroxide with a concentration of 3% (w/w) for 60 mins, and then squeezing it to obtain alkalized bagasse with a water content of 60% for use;

(2) filament-rubbing or cutting 30 kg sugarcane tip leaves into small segments of about 3-4 cm, adding the alkalized sugarcane bagasse obtained in step (1), and mixing and stirring well to obtain a coarse feed;

(3) adding 10 kg molasses, 6 kg corn flour, 5 kg soybean residual, 5 kg rapeseed meal, 10 kg cassava residual, 1 kg carbamide, 0.5 kg dicalcium phosphate, 0.5 kg limestone powder, 1 kg pre-mixture and 0.5 kg bacteria strain into the coarse feed obtained in step (2), and mixing well; and (4) compressing the mixed material obtained in step (3) into cubes of a certain length by the hydraulic baling device, and then storing in a sealed bag for more than 10 days.

Comparison Example 1. Formula of Complete Ration for Normal Fattening in the First Stage (at an Age of 7-13 Months)

Corn straw silage (40%), bagasse (5%), beer residual (35%), molasses (5%), beneficiated material (15%, corn flour accounting for 50%, soybean residual 5%, rapeseed meal 15%, palm meal 15%, bran 9%, salt 1%, sodium bicarbonate 1%, dicalcium phosphate 1%, limestone powder 1%, pre-mixture 1%, etc.).

Comparison Example 2. Formula of Complete Ration for Normal Fattening in the Second Stage (at an Age of 14-18 Months)

Corn straw silage (40%), bagasse (5%), beer residual (30%), molasses (10%), beneficiated material (20%, corn flour accounting for 50%, soybean residual 5%, rapeseed meal 15%, palm meal 15%, bran 9%, salt 1%, sodium bicarbonate 1%, dicalcium phosphate 1%, limestone powder 1%, pre-mixture 1%, etc.).

Comparison Example 3. Formula of Complete Ration for Normal Fattening in the Third Stage (at an Age of 19-24 Months)

Corn straw silage (35%), bagasse (10%), beer residual (30%), molasses (15%), beneficiated material (10%, corn flour accounting for 50%, soybean residual 5%, rapeseed meal 15%, palm meal 15%, bran 9%, salt 1%, sodium bicarbonate 1%, dicalcium phosphate 1%, limestone powder 1%, pre-mixture 1%, etc.).

Comparison Example 4

(1) Adding water to 10 kg bagasse to adjust the water content to 80%, immersing it in the sodium hydroxide with a concentration of 8% (w/w) for 20 mins, and then squeezing it to obtain alkalized bagasse with a water content of 65% for use;

(2) filament-rubbing or cutting 80 kg sugarcane tip leaves into small segments of about 3-4 cm, adding the alkalized bagasse obtained in step (1), and mixing and stirring well to obtain a coarse feed;

(3) adding 10 parts of molasses, 10 parts of corn flour, 7.5 parts of peanut bran, 7.5 parts of rapeseed meal, 7.5 parts of cassava residual, 0.6 part of carbamide, 1 part of dicalcium phosphate, 0.75 part of limestone powder, 0.3 part of bacteria strain, and 0.75 part of pre-mixture into the coarse feed obtained in step (2), and mixing well; and (4) compressing the mixed material of step (3) into cubes of a certain length cubic by the hydraulic baling device, and then storing in a sealed bag for more than 10 days.

Comparison Example 5

The following materials are well mixed: 30 kg bagasse, 45 kg sugarcane tip leaves, 15 kg molasses, 10 kg corn flour, 7.5 kg peanut bran, 7.5 kg rapeseed meal, 7.5 kg beer residual, 0.6 kg carbamide, 1 kg dicalcium phosphate, 0.75 kg limestone powder, 0.75 kg pre-mixture and 0.3 kg bacteria strain. The mixed materials are compressed into cubes of a certain length by the hydraulic baling device, and then are stored in a sealed bag for more than 10 days.

Experiment Example 1

(1) Feed Cost Analysis

Cost calculation of the feeds produced by Embodiments 1 to 3 and Comparison examples 1 to 3 is performed, and the results are shown in Table 1.

TABLE 1 feed cost of each group

| Feed | Comparison example 1 | Comparison example 2 | Comparison example 3 | Embodiment 1 | Embodiment 2 | Embodiment 3 |
|---|---|---|---|---|---|---|
| 1 Kg Feed cost/ RMB | 0.69 | 0.78 | 0.56 | 0.54 | 0.71 | 0.44 |

Note:
the above cost is calculated based on: straw silage 400 RMB/ton, bagasse 230 RMB/ton, sugarcane tip leaves 220 RMB/ton, corn flour 2350 RMB/ton, peanut bran 3000 RMB/ton, soybean residual 2630 RMB/ton, beer residual 480 RMB/ton, cassava residual 250 RMB/ton, and molasses 920 RMB/ton.

(2) Feeding Experiment

Three comparison experimental groups are studied:

1. Select 60 beef cattle at an age of 7-13 months, dividing them into 2 groups randomly and providing them with the feed of Comparison example 1 and Embodiment 1, respectively.

2. Select 60 beef cattle at an age of 14-18 months, dividing them into 2 groups randomly and providing them with the feed of Comparison example 2 and Embodiment 2, respectively.

3. Select 60 beef cattle at an age of 19-24 months, dividing them into 2 groups randomly, providing them with the feed of Comparison example 3 and Embodiment 3, respectively.

The beef cattle are weighed before experiments and each group of beef cattle are fed with corresponding feed without stopping and freely. Tables 2-4 show the results that how each group affects the growing of beef cattle:

TABLE 2 results comparison of beef cattle at an age of 7-13 months after feeding for 60 days

| Group | feed consumption (kg per beef cattle) | Average increase in weight (kg) | Ratio between feed and weight | feed cost per 1 kg weight gain |
|---|---|---|---|---|
| Comparison example 1 | 1378 | 66.7 | 20.7 | 14.3 |
| Embodiment 1 | 1266 | 69.8 | 18.1 | 9.8 |

TABLE 3 results comparison of beef cattle at an age of 14-18 months after feeding for 60 days

| Group | feed consumption (kg per beef cattle) | Average increase in weight (kg) | Ratio between feed and weight | feed cost per 1 kg weight gain |
|---|---|---|---|---|
| Comparison example 2 | 1563 | 80.1 | 19.5 | 15.2 |
| Embodiment 2 | 1357 | 83.2 | 16.3 | 11.5 |

TABLE 4 results comparsion of beef cattle at an age of 19-24 months after feeding for 60 days

| Group | feed consumption (kg per beef cattle) | Average increase in weight (kg) | Ratio between feed and weight | feed cost per 1 kg weight gain |
|---|---|---|---|---|
| Comparison example 3 | 1598 | 37. | 43.0 | 24.1 |
| Embodiment 3 | 1530 | 42.5 | 36.0 | 15.84 |

Experiment results from Tables 2-4 show that the ratio between feed and weight is lower when feeding the feed of the Embodiments than feeding the feed of Comparison examples for the beef cattle in three fattening stages. The reason lies in that the alkalized bagasse in the formula of the present invention can damage the cell wall structure, and meanwhile when the alkalized bagasse is mixed with the sugarcane tip leaves, the alkaline solution left in the bagasse alkalizes the sugarcane tip leaves, resulting in an increased digestibility and a dramatically decreased digestible energy of the sugarcane tip leaves and bagasse. Thus, the beef cattle have an obvious weight even in case of lower intake. As can be seen from the feed cost for increasing 1 kg weight, the feed cost of the feeding embodiments is obviously decreased as compared to that of the comparison group, thus the formula of the complete ration of the present invention has the advantages of promoting digestive absorption and improving the rate of feed return, etc., and has an feeding effect far superior to that of regular feed formula.

Experiment Embodiment 2

Three feeding experimental groups are studied:

1. Select 150 beef cattle at an age of 7-13 months, dividing them into 5 groups randomly, and providing them with the feed of Comparison example 4-5 and Embodiment 1-3, respectively.

2. Select 150 beef cattle at an age of 14-18 months, dividing them into 5 groups randomly and providing them with the feed of Comparison example 4-5 and Embodiment 1-3, respectively.

3. Select 150 beef cattle at an age of 19-24 months, dividing them into 5 groups randomly and providing them with the feed of Comparison example 4-5 and Embodiment 1-3, respectively.

The beef cattle are weighted before experiments and each group of beef cattle are fed with corresponding feed without stopping and freely. Table 5 shows the results that how each group affects the growing of the beef cattle:

TABLE 5

Ratio between feed and weight after feeding for 60 days

| Feed | Ratio between feed and weight | | |
|---|---|---|---|
| | beef cattle at an age of 7-13 months | beef cattle at an age of 14-18 months | beef cattle at an age of 19-24 months |
| Experiment 1 | 18.1 | 22.0 | 43.8 |
| Experiment 2 | 23.2 | 16.3 | 41.4 |
| Experiment 3 | 42.1 | 42.8 | 36.0 |
| Comparison example 4 | 44.7 | 45.4 | 48.2 |
| Comparison example 5 | 53.4 | 52.5 | 64.4 |

Experiment results from Table 5 show that feeding the beef cattle in correspondingly fattening stages with feeds (the feeds of Embodiments 1-3) formulated according to different fattening stages of beef cattle has the lowest ratio between feed and weight. It indicates that the feed made of the same materials but in different ratios or methods shows different adaptability to beef cattle in different fattening stages, and only the complete ration satisfying the nutrition requirements of corresponding fattening stages can achieve the effect of low input and high output.

What is claimed is:

1. A method for formulating a complete ration suitable for beef cattle in different fattening stages, wherein the complete ration includes the following materials: bagasse 15~45 parts, sugarcane tip leaves 25~70 parts, molasses 4~18 parts, corn flour 1~12 parts, legume by-product 4~12 parts, rapeseed meal 4 ~12 parts, residue 4 ~12 parts, carbamide 0.1~1.2 parts, dicalcium phosphate 0.4~1.8 parts, limestone powder 0.4~1.2 parts, bacteria strain 0.05~0.6 part and pre-mixture 0.4~1.2 parts, and all parts are parts by weight;

wherein the legume by-products are peanut bran or soybean residue;

wherein the residue is beer residue or cassava residue;

wherein the complete ration is prepared by the following steps:

(1) adjusting water content of bagasse to 55~85%, immersing the bagasse in an alkaline solution for 15~65 mins, and then squeezing it to obtain alkalized bagasse for use;

(2) filament-rubbing or cutting the sugarcane tip leaves into segments, adding the alkalized bagasse obtained in step (1), and mixing and stirring well to obtain a coarse feed;

(3) adding molasses, corn flour, peanut bran, soybean residue, rapeseed meal, beer residue or cassava residue, carbamide, dicalcium phosphate, limestone powder, strain and pre-mixture to the coarse feed obtained in step (2), and mixing well; and (4) storing in a sealed bag for more than 10 days.

2. The formulating method of claim 1, wherein in step (1), the water content of the bagasse is adjusted to 60%~80%.

3. The formulating method of claim 1, wherein in step (1), alkaline solution is sodium hydroxide solution, with a concentration of 3%~8% by mass percent.

4. The formulating method of claim 1, wherein in step (1), the alkaline solution immersion is performed for 20-60 mins.

5. The formulating method of claim 1, wherein in step (1), the water content of the alkalized bagasse is 55%~65%.

* * * * *